United States Patent [19]
Fujino et al.

[11] Patent Number: 5,132,718
[45] Date of Patent: Jul. 21, 1992

[54] CAMERA WITH FLASHLIGHT EMITTING DEVICE

[75] Inventors: Akihiko Fujino; Reiji Seki; Noriyuki Ishii; Sadanobu Ueda; Nobuyuki Taniguchi, all of Osaka, Japan

[73] Assignee: Minolta Camera Kabushiki Kaisha, Osaka, Japan

[21] Appl. No.: 527,755

[22] Filed: May 23, 1990

[30] Foreign Application Priority Data

| May 24, 1989 | [JP] | Japan | 1-131749 |
| May 24, 1989 | [JP] | Japan | 1-131750 |
| May 24, 1989 | [JP] | Japan | 1-131751 |
| May 24, 1989 | [JP] | Japan | 1-131752 |

[51] Int. Cl.[5] ............................ G03B 15/03
[52] U.S. Cl. .................. 354/413; 354/127.1; 354/149.1
[58] Field of Search ............. 354/149.1, 127.1, 413

[56] References Cited

U.S. PATENT DOCUMENTS

| 4,423,940 | 1/1984 | Kashihara et al. | 354/149.1 |
| 4,743,929 | 5/1988 | Taniguchi et al. | 354/149.1 |
| 4,851,868 | 7/1989 | Taniguchi et al. | 354/149.1 |
| 4,935,759 | 6/1990 | Tsuji et al. | 354/149.1 |

OTHER PUBLICATIONS

Catalogue entitled "Minolta 9000 Product Guide".
Catalogue entitled "Minolta Dynax 7000i".
Article entitled "Modern Tests—Yashica Samurai" from "Modern Photography", Apr. 1989, pp. 50–57.
Article of "Olympus Infinity Super 200M (IZM) 330 Camera" (2 pages).

Primary Examiner—Russell E. Adams
Attorney, Agent, or Firm—Willian, Brinks, Olds, Hofer, Gilson & Lione

[57] ABSTRACT

A flashlight emitting device for a camera wherein the flash coverage of a flash device is varied, only when a mode in which flashlight is to be emitted is selected, in response to a zooming operation to assure appropriate exposure and eliminate wasteful consumption of power. The device comprises flashlight emitting means, mode changing over means operable in response to operation of a manually operable member for selecting one of a first mode in which daylight photographing is to be performed and a second mode in which the flashlight emitting means may be rendered operative to effect flashlight photographing, exposure controlling means for effecting exposure control in accordance with a selected mode, driving means for varying the flash coverage of the flashlight emitting means between a tele side and a wide side in response to a variation of the focal length of a lens of the camera, and driving controlling means for rendering the driving means inoperative when the first mode is selected by the mode changing over means but enabling operation of the driving means when the second mode is selected by the mode changing over means.

14 Claims, 10 Drawing Sheets

CAMERA WITH FLASHLIGHT EMITTING DEVICE

BACKGROUND OF THE INVENTION

1. Field of the Invention

This invention relates to a camera with a flashlight emitting device.

2. Description of the Prior Art

In recent years, cameras of the lens shutter type having a built-in flash device are on the market which include a zoom lens having a focal length which can be varied continuously. In a camera of the type mentioned, a flash coverage or irradiation angle of flashlight from the flash device is normally varied in response to a zooming operation of the zoom lens.

However, a camera wherein a flash coverage is varied in response to a zooming operation while a mode in which flashlight is ot emitted is selected by a user not only consumes power wastefully but also may make the user feel disagreeable. Besides, such camera is inconvenient to a user in that, upon use thereof, it can photograph an object only within a zooming range of the zoom lens.

Further, in a camera of the lens shutter type having a built-in flash device and including a zoom lens, after a flash coverage is varied in response to a zooming operation, a focusing operation of the lens is performed in response to completion of such zooming operation.

However, if a focusing operation is held inhibited while a flash coverage is being varied in response to a zooming operation, then so much time is required until initiation of photographing that a shutter chance may possibly be lost.

Meanwhile, in a camera of another type which has a built-in flash device and is capable of mounting an interchangeable lens thereon, a flash coverage of the flash device is fixed to a predetermined angle. Since such flash coverage is fixed in the camera of the type just mentioned, a certain focal length of the lens may result in unnatural exposure.

On the other hand, various cameras are also on the market which include an interchangeable camera and which control, when a flash device is mounted, the flash coverage of the flash device to a flash coverage corresponding to a focal length of the interchangeable lens in response to operation of a release button.

In a camera of the type mentioned just above, a change of the focal length of the interchangeable lens will not cause a variation of the flash coverage, and the flash coverage is not varied until the release button is operated. Accordingly, when it is intended to operate the release button suddenly to take a photograph, such photographing may be effected while the flash coverage remains in such a condition wherein it does not correspond to a current focal length of the lens. Such photographing may result in irregular flash coverage.

Also, cameras are on the market which have a built-in lens having a variable focal length and a built-in flash device having a variable flashlight irradiating range and wherein the focal length of the lens and the flash coverage of the flash device are varied in response to operation of a release button or of a focal length varying operating member such as a power zooming button.

In a camera of the type just mentioned, the lens and the flash device are connected mechanically to each other such that variation of the focal length and variation of the flashlight irradiation range may be performed simultaneously by a single electromagnetic driving means. Such mechanism can be realized with a camera which has a built-in lens and a built-in flash device. In the case of a camera which includes an interchangeable lens, however, it is very difficult to mechanically connect a lens and a flash device to each other particularly because different interchangeable lenses are interchangeably mounted on the camera.

SUMMARY OF THE INVENTION

It is an object of the present invention to provide a camera wherein the flash coverage of a flash device is varied, only when a mode in which flashlight is to be oemitted is selected, in response to a zooming operation to assure appropriate exposure and eliminate wasteful consumption of power.

It is another object of the present invention to provide a camera of the interchangeable lens type wherein the flash coverage of a flash device is varied, when a zoom lens is mounted on the camera, in response to a zooming operation to permit photographing to be performed with flashlight of a flash coverage suitable for a focal length of the lens, but the flash coverage is prevented, when no lens is mounted on the camera, from being varied to eliminate wasteful consumption of power.

It is a further object of the present invention to provide a camera wherein, even while the flash coverage of a flash device is being varied during a zooming operation, driving of a focusing motor is permitted to improve the quick photographing performance and operability of the camera.

It is a still further object of the present invention to provide a camera wherein the flash coverage of a flash device can be varied even when an interchangeable lens of the power zooming type is mounted on the camera.

It is a yet further object of the present invention to provide a camera wherein an appropriate illumination effect is assured with a flash device even if the focal length of a lens is varied upon self-timer photographing.

It is a yet further object of the present invention to provide a camera wherein irregular irradiation of flashlight from two flashlight emitting devices when they are lit simultaneously is prevented or minimized.

It is an additional object of the present invention to provide a camera which effectively prevents a red eye phenomenon and irregular irradiation and is improved in quick photographing performance.

In order to attain the objects, according to an aspect of the present invention, there is provided a flashlight emitting device for a camera, which comprises flashlight emitting means, a manually operable member, mode changing over means operable in response to a manual operation of the manually operable member for selecting one of a first mode in which daylight photographing is to be performed and a second mode in which the flashlight emitting means is rendered operative, when required, in order for the camera to effect flashlight photographing, exposure controlling means for effecting exposure control in accordance with a mode selected by the mode changing over means, driving means for varying the flash coverage of the flashlight emitting means between a tele side and a wide side in response to a variation of the focal length of a lens of the camera, a power source for supplying power to the flashlight emitting means, exposure controlling means and driving means, and driving controlling means for rendering the driving means inoperative when the first mode is selected by the mode changing over means but enabling operation of the driving means when the second mode is selected by the mode changing over means.

With the flashlight emitting device, when the first mode is selected, changing over of the flash coverage of the flashlight emitting means is inhibited, and accordingly, wasteful consumption of power can be prevented. On the other hand, when the second mode is selected, the flash coverage of the flashlight emitting means is changed over in response to a variation of the focal length of the lens. Accordingly, flashlight photographing can be performed very effectively.

According to another aspect of the present invention, there is provided a flashlight emitting device for a camera, which comprises exposure controlling means, judging means for judging presence or absence of an interchangeable lens on the camera, flashlight emitting means for emitting flashlight upon exposure of a film, driving means for varying the flash coverage of the flashlight emitting means between a tele side and a wide side in response to a variation of the focal length of said interchangeable lens, a power source for supplying power to the exposure controlling means, flashlight emitting means and driving means, and driving controlling means for controlling operation of the driving means such that, when presence of an interchangeable lens on the camera is judged by the judging means, the driving means is rendered operative, but when absence of an interchangeable lens on the camera is judged by the judging means, the driving means is rendered inoperative.

With the flashlight emitting device, when an interchangeable lens is removed from the camera, changing over of the flash coverage of the flashlight emitting means is inhibited, and consequently, wasteful consumption of power can be prevented. On the other hand, when an interchangeable lens is mounted on the camera, the flash coverage of the flashlight emitting means is changed over automatically, and accordingly, the operability is improved.

According to a further aspect of the present invention, there is provided a flashlight emitting device for a camera, which comprises flashlight emitting means for emitting flashlight upon exposure of a film, flash coverage changing over driving means for changing over the flash coverage of the flashlight emitting means between a tele side and a wide side in response to a variation of the focal length of a lens of the camera, first controlling means for controlling operation of the flash coverage changing over driving means, automatic focusing means for automatically focusing the lens, focusing driving means for operating the automatic focusing means in response to a signal from the controlling means, a power source for supplying power to the flashlight emitting means, flash coverage changing over driving means, automatic focusing means and focusing driving means, and second controlling means for permitting operation of the focusing driving means even during operation of the flash coverage changing over driving means so that the flash coverage changing over driving means and the focusing driving means may be driven simultaneously.

With the flashlight emitting device, a flash coverage changing over operation and a focusing operation involved in a zooming operation can be controlled simultaneously by the second controlling means. Consequently, an interval of time from such zooming operation till starting of photographing can be reduced significantly. Accordingly, the operability and the quick photographing performance are improved.

According to a still further aspect of the present invention, there is provided a camera capable of receiving thereon an interchangeable lens which includes electromagnetic means serving as a driving source for the variation of the focal length of the interchangeable lens, a manually operable member for activating the electromagnetic means, and means for delivering a starting signal to the camera in response to an operation of the manually operable member, which comprises release signal producing means for producing a release signal for starting operation of the camera, means for receiving a starting signal from an interchangeable lens mounted on the camera, reading means for reading data regarding a focal length of an interchangeable lens mounted on the camera, determining means for determining a flash coverage of a flash device built in or mounted on the camera in response to data read by the reading means, driving signal producing means for producing a signal for electrically driving a flashlight emitting element of the flash device built in or mounted on the camera so that the flash device may have a flash coverage determined by the determining means, and controlling means for starting, when an interchangeable lens of a type operable by the release signal or the starting signal is mounted on the camera, operation of the reading means, determining means and driving signal producing means in response to the starting signal.

With the camera, if the manually operable member of an interchangeable lens mounted on the camera is manually operated to vary the focal length of the lens, such operation signal so that the flash coverage of the flash device built in or mounted on the camera is rapidly varied in response to the focal length of the interchangeable lens which varies in response to such manual operation of the manually operable member of the lens. Accordingly, even if a photographing operation is performed suddenly, the flash coverage of the flash device can quickly correspond to the focal length of the lens, and consequently, a possible irregular flash coverage can be prevented. Further, since no mechanical connection is required between the lens and the flash device, even with a camera of the interchangeable lens type, the flash coverage of the flash device can be varied in accordance with a variation of the focal length of the lens.

The above and other objects, features and advantages of the present invention will become apparent from the following description and the appended claims, taken in conjunction with the accompanying drawings in which like parts are denoted by like reference characters all through the drawings.

BRIEF DESCRIPTION OF THE DRAWINGS

FIGS. 3 to 6 are flow charts showing details of the flow of FIGS. 2A and 2B.

FIG. 7 is a flow chart illustrating operation of a power zoom lens of the camera system of FIGS. 1A and 1B and FIGS. 8A and 8C illustrate a flow chart illustrating operation of an external flash device.

DESCRIPTION OF THE PREFERRED EMBODIMENT

Figure 1A:
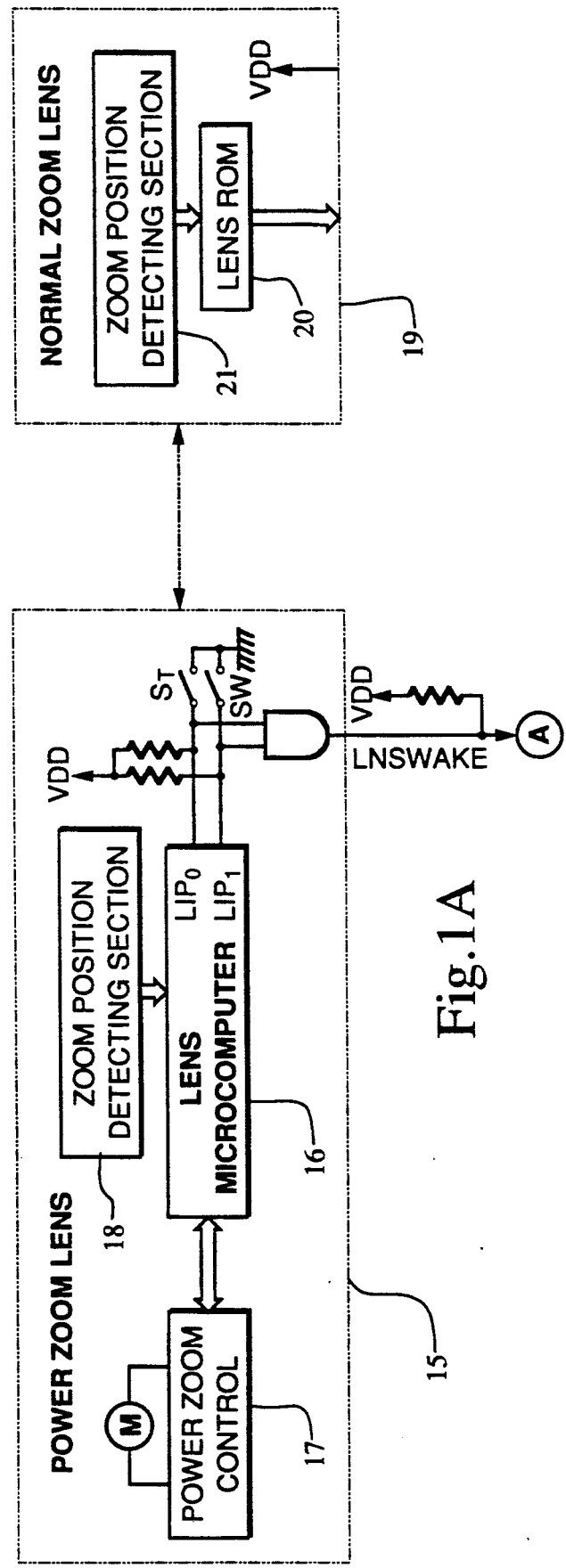
FIGS. 1A and 1B illustrate a block diagram of an entire electric circuit construction of a camera system showing a preferred embodiment of the present invention.
Figure 1B:
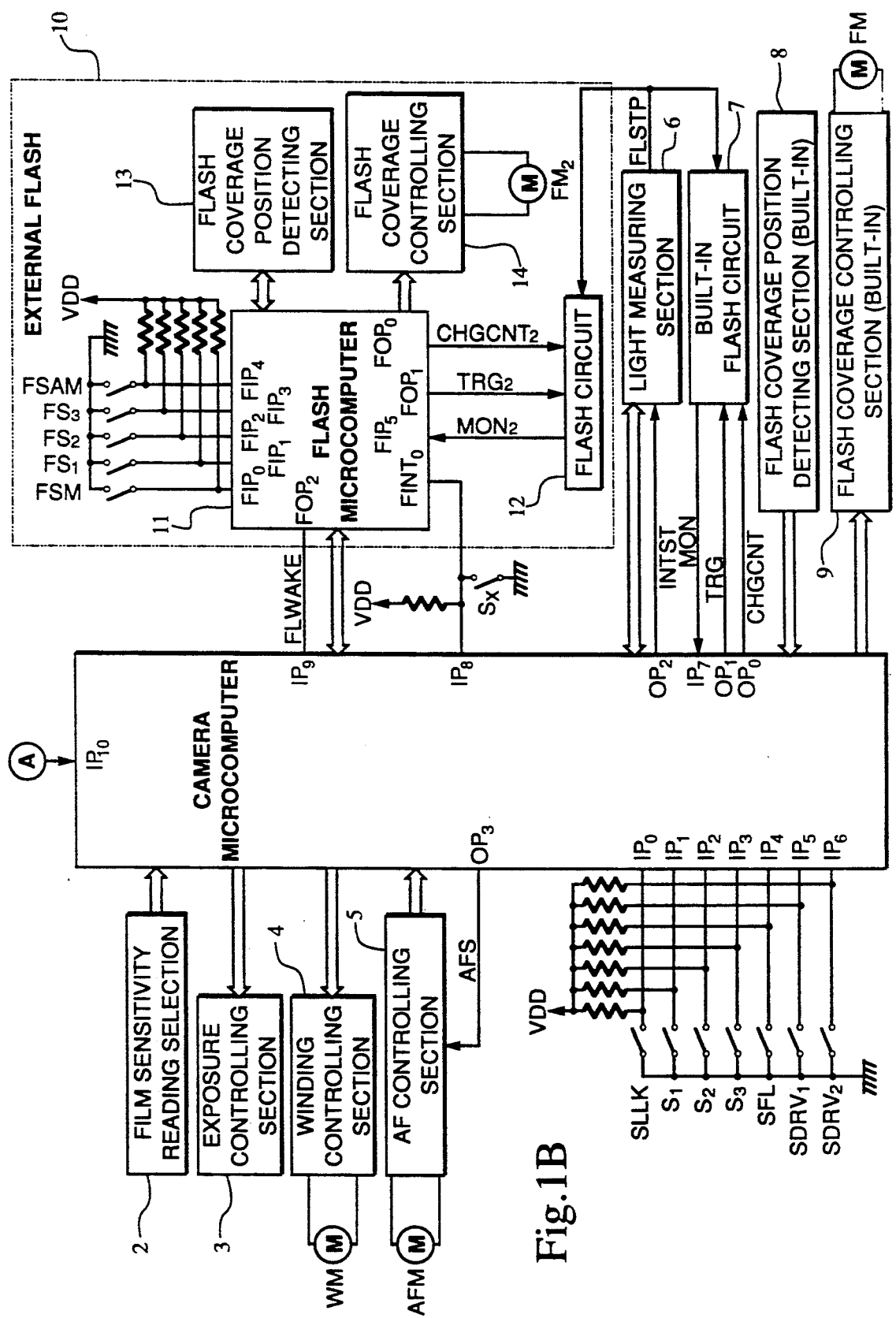

Referring to FIGS. 1A and 1B there is shown an entire electric circuit of a camera system to which the present invention is applied. Resistors included in the circuit shown in FIGS. 1A and 1B are all used for the pulling up of associated terminals and are connected to a power source VDD. Here, detailed description of the power source is omitted.

The electric circuit of the camera system includes a microcomputer 1 of a camera body (not shown) for controlling sequence operations, and exposure operation and so forth of a camera of the camera system. The microcomputer 1 of the camera body will be hereinafter referred to as camera microcomputer 1. The camera microcomputer 1 has input ports IPO to IPIO and output ports OPO to OPS. A film sensitivity reading section 2 reads ISO code data on a film magazine not shown and transmits the data to the camera microcomputer 1. An exposure controlling section 3 executes driving control of a mirror, a diaphragm aperture and a shutter (all not shown) of the camera under the control of the camera microcomputer 1. A winding controlling section 4 drives a winding motor WM under the control of the camera microcomputer 1 to perform charging of the shutter and winding of a film. An AF (automatic focusing) controlling section 5 executes a distance measuring calculation and driving of an AF motor AFM to automatically focus a lens system of the camera. Such operation is started or stopped in response to a control signal AFS from the camera microcomputer 1. In particular, operation of the AF controlling section 5 is enabled when the control signal AFS is at a low level ("L") but is disabled when the control signal AFS is at a high level ("H").

A switch SLLK operates in response to mounting or removal of an interchangeable lens and presents an on-state when a lens is mounted but presents an off-state when the lens is removed or no lens is mounted. Switches S1 and S2 are turned on when a shutter release button (not shown) is depressed to a first depth and a second depth greater than the first depth, respectively. While the switch S1 remains in an on-state, the camera performs a light measuring operation, a distance measuring operation and an AF operation, and when the switch S2 is changed into an on-state, the camera enters a shutter release operation. a film winding completion detecting switch S3 is turned on during exposure control and then turned off upon completion of a film winding operation. A mode setting switch SFL is provided to set a mode of a built-in flash device of the camera, and when the mode setting switch SFL is in an on-state, the built-in flash device operates in an automatic light emission mode, but when the mode setting switch SFL is in an off-state, the built-in flash device operates in a light emission inhibition mode. Switches SDRV1 and SDRV2 are provided to set one of a successive photographing mode, a single photographing mode and a self mode in a known manner. A switch SX for the flash synchronization is turned on upon completion of movement of a leading shutter blind of the shutter.

A light measuring section 6 measures a brightness of an object which has passed through the photographing lens and transmits the measured brightness as brightness data to the camera microcomputer 1. The light measuring section 6 includes a flashlight measuring circuit for the automatic flashlight control and causes the flashlight measuring circuit to start a light integrating operation in response to an integration starting signal INTST received from the camera microcomputer 1 upon exposure control. The light measuring section 6 then produces a flashlight emission stopping signal FLSTP when a predetermined integration level is reached. It is to be noted that such predetermined integration level is automatically set in response to film sensitivity data transmitted from the camera microcomputer 1.

A built-in flash circuit 7 includes a boosting circuit, a charge completion detecting circuit, a light emission trigger circuit and a light emission stopping circuit. A boosting controlling signal CHGCNT is delivered from the camera microcomputer 1 to the built-in flash circuit 7 to control starting and stopping of boosting of the built-in flash circuit 7. A charge completion detection signal MON representative of completion or incompletion of charging is transmitted from the built-in flash device 7 to the camera microcomputer 1. A light emission trigger signal TRG for triggering the built-in flash device is delivered from the camera microcomputer 1 when the camera microcomputer 1 detects transition of the synchronization switch SX from an off-state to an on-state. The built-in flash device emits flashlight therefrom in response to such light emission trigger signal TRG. Also a flashlight emission stopping signal FLSTP mentioned hereinabove is inputted to the built-in flash circuit 7 to stop emission of flashlight from the built-in flash device. A flash coverage position detecting section 8 detects a current flash coverage position of the built-in flash device, that is, a current position of a member which can vary the flash coverage by displacement thereof such as, for example, a light emitting panel, a reflector or a xenon tube, and transmits the thus detected current position to the camera microcomputer 1. Since various known methods including a method which employs a code plate can be applied for such position detection, no detailed description is given of such method herein. A flash coverage controlling section 9 drives a motor FM for the driving for the changing over of the flash coverage of the built-in flash device to move such flash coverage changing member as described above to an appropriate position corresponding to data fed from the camera microcomputer 1.

An external flash device 10 is removably mounted on the camera. A microcomputer 11 for controlling the external flash device 10 executes data communications with the camera microcomputer 1 and controls operation of the external flash device 10. The microcomputer 11, will be hereinafter referred to as flash microcomputer 11. The external flash device 10 includes a boosting circuit, a charge completion detecting circuit, a light emission trigger circuit and a flashlight control circuit. A boosting controlling signal CHGCNT2 is delivered from the flash microcomputer 11 and controls starting or stopping of a boosting operation of an external flash circuit 12. A charge completion detection signal MON2 representative of completion or incompletion of charging of the external flash circuit 12 is transmitted to the flash microcomputer 11. A light emission trigger signal TRG2 for triggering the external flash device 10 is produced from the flash microcomputer 11 when the flash microcomputer 11 detects transition of the synchronization switch SX from an off-state to an on-state and causes the external flash device 10 to emit flashlight. Meanwhile, a flashlight emission stopping signal FLSTP mentioned hereinabove from the light measuring section 6 of the camera body is also inputted to the external flash circuit 12 to cause stopping of emission of flashlight from the external flash device 10. A flash coverage position detecting section 13 for the external flash device 10 detects a current flash coverage position of the external flash device and transmits the same to the flash microcomputer 11. Description of this is also omitted herein. A flash coverage controlling section 14 for the external flash device 10 drives a motor FM2 for the driving for the changing over of the flash coverage of the external flash device 10 to move a flash coverage changing member of the external flash device to an appropriate position corresponding to data received from the flash microcomputer 11.

A main switch FSM of the external flash device 10 inhibits, when it is in an off-state, all operations of the external flash device 10, but permits all operations of the external flash device 10 including a flashlight emitting operation when it is in an on-state.

Manually operable flash coverage setting switches FS1, FS2 and FS3 are provided to manually set a flash coverage of the external flash device 10. Here, no detailed description is given of combinations of them. An automatic/manual selecting switch FSAM for the distribution of flashlight is provided in order to automatically set, when the switch FSAM is in an off-state, a flash coverage angle of flashlight at a value corresponding a focal length of the lens but to set, when the switch FSAM is in an on-state, a flash coverage angle of flashlight at a value manually set by the manual flash coverage setting switches FS1 to FS3. Meanwhile, when manual setting of a flash coverage is selected by way of the switch FSAM, if a flash coverage value manually set by the switches FS1 to FS3 is different from a current flash coverage position from the flash coverage position detecting section 13, the flash microcomputer 11 changes a signal FLWAKE to an "L" level to start the camera microcomputer 1. Consequently, in case manual setting of a flash coverage if performed on the external flash device 10 side, setting of a flash coverage on the built-in flash device is also performed in a synchronized relationship with such flash coverage setting on the external device 10.

An electrically driven power zoom lens 15 having a variable focal length is removably mounted on the camera body. A microcomputer 16 of the power zoom lens 15, which will be hereinafter referred to as lens microcomputer 16, executes transmission of lens data to the camera microcomputer 1 and control of a power zooming operation. A power zoom controlling section 17 drives a power zoom driving motor ZM in response to data received from the lens microcomputer 16. A zoom position detecting section 18 transmits data corresponding to a current focal length of the lens to the lens microcomputer 16.

A pair of power zooming switches ST and SW are provided to zoom, when they are turned on, the focal length of the lens to the tele photographing side and the wide photographing side, respectively. Further, if one of the switches ST and SW is turned on, then an AND circuit AN delivers an output LNSWAKE of an "L" level to start the camera microcomputer 1. Consequently, in case a zooming operation is performed on the power zoom lens 15 side, the camera microcomputer 1 can control a distribution of flashlight in a synchronized relationship with the power zooming operation.

A normal lens 19 is a manual zoom lens which has no power zooming function but allows a manual zooming operation thereof. Such normal lens 19 can be mounted on the camera in place of the power zoom lens 15. A lens ROM (read-only memory) 20 of the normal lens 19 transmits data corresponding to a manually set focal length of the normal lens 19 to the camera microcomputer 1. It is to be noted that, since the normal lens 19 requires no power zooming switch, a signal LNSWAKE which is to be transmitted from the lens ROM 20 to the camera microcomputer 1 is set to normally present an "H" level. A zoom position detecting section 21 transmits data corresponding to a current focal length of the lens to the lens ROM 20.

Subsequently, a general flow of operation of the camera microcomputer 1 will be described with reference to FIGS. 2A and 2B.

When a battery not shown is first loaded in position into the camera, the camera microcomputer 1 starts its operation beginning with a reset routine. In the reset routine, the output ports OP0 to OP3 and a RAM (random access memory, not shown) of the camera microcomputer 1 are initialized at step #1, and then the sequence advances to a next standby routine. In the standby routine, the switch S1 is first checked at step #2. If the switch S1 is in an on-state, then the sequence advances to a subsequent WAKE routine. But on the contrary, if the switch S1 is in an off-state, then the sequence advances to step #3 at which presence or absence of an interchangeable lens 15 or 19 on the camera, a power zooming operation and a manual flash coverage changing over operation are judged in accordance with signals SLLK, LNSWAKE and FLWAKE, respectively, and further if changing over of a flash coverage is required, changing over of a flash coverage is executed. After completion of such changing over of a flash coverage, or if the factor for the starting has disappeared, the sequence returns to the standby routine. The routine will be hereinafter described in detail.

In case the sequence advances to the WAKE routine since the switch S1 is in an on-state at step #2, the signal AFS is first changed to an "L" level at step #4 to send a starting signal to the AF controlling section 5. Consequently, the AF controlling section 5 starts a distance measuring operation in which the control advances from a distance measuring calculation to driving of the AF motor AFM.

Subsequently at step #5, an ISO code is read in from the film sensitivity reading section 2 and stored into the internal RAM of the camera microcomputer 1. After then, the sequence advances to step #6 at which lens data including focal length information and so forth are inputted from a power zoom lens 15 or a normal lens 19 mounted on the camera body.

Then at step #7, lens data necessary for a distance measuring operation and driving of the AF motor AFM by the AF controlling section 5 are transmitted from the camera microcomputer 1 to the AF controlling section 5. Subsequently, light measurement data are read in from the light measuring section 6 at step #8, and then at step #9, data of the external flash device 10 mount of the external flash device, (completion or incompletion of charging, automatic or manual changing operation of a flash coverage of flashlight, a manually set flash coverage position upon manual changing over of a flash coverage) are read in from the flash microcomputer 11. It is to be noted, in case no external flash device is mounted on the camera, or if an external flash device is mounted on the camera but the switch FSM is in an off-state, then mount data is not inputted, but if the external flash device 10 is in an automatic light emission mode, i.e., the switch FSM is in an on-state, mount data is inputted. After then, the switch SFL is checked at step #10 to judge whether the built-in flash device is in an automatic light emission mode or in a light emission inhibition mode. Then, in accordance with data obtained in this manner, an exposure calculation is executed to determine emission or no emission of flash light, a shutter speed and an aperture control value. If at least one of the built-in flash device and the external flash device 10 is in an automatic light emission mode, then it is permitted to select a shutter speed and an aperture value for the flashlight photographing (hereinafter referred to as flashlight photographing mode) independent of a charged condition (that is, even if neither of them is in a fully charged condition). It is to be noted that a flashlight photographing mode is automatically selected when an object to be photographed is dark.

Subsequently, the sequence advances to step #11. At step #11, it is judged whether or not the photographing mode selected by the exposure calculation is a flashlight photographing mode, and in case the selected photographing mode is a flashlight photographing mode, then the sequence advances to step #12. At step #12, charging control of the built-in flash device and release locking when the built-in flash device is not in a fully charged condition are executed. Description of charging of the external flash device 10 is not described here because it is automatically executed in case the switch FSM is in an on-state.

At those steps #11 and #12, although it will be hereinafter described in detail, in case only one of the built-in flash device and the external flash device is set in an automatic light emission mode, if the flash device which is set in an automatic light emission mode is not yet in a fully charged condition, then release locking is executed for the flash device. On the other hand, if both of the built-in flash device and the external flash device are set in an automatic light emission mode, shutter release is permitted if at least one of them is in a fully charged condition. Subsequently, flash coverage control is executed at step #13. Flash coverage control of the external flash device is automatically executed at the present step #13 by transmitting focal length information of the lens to the external flash microcomputer 11.

After then, an in-focus condition in an AF operation is checked at step #14, and if an in-focus condition is not yet reached, then the sequence advances to step #28. However, even if an in-focus condition is determined at step #14, if the switch S2 is in an off-state subsequently at step #15, the sequence also advances to step #28. At step #28, the switch S1 is checked, and if the switch S1 is in an on-state, then the sequence advances to the WAKE routine. In this instance, the steps beginning with the step #4 are sequentially and successively executed. Accordingly, a series of operations such as an AF operation (which successively proceeds focusing of the lens) and a light measuring exposure calculation are continued or repeated so far as the switch S1 remains in an on-state.

On the contrary, if it is judged at step #28 that the switch S1 is in an off-state, then the sequence advances to step #29 at which an AF operation is stopped. This is effected by the AF controlling section 5 when the camera microcomputer 1 changes the signal AFS to an "H" level. Then at step #30, a flash coverage changing over operation is stopped. In this instance, as flash coverage changing over inhibiting data are transmitted also to the external flash device 10, a flash coverage changing over operation of the external flash device 10 is automatically stopped by the flash microcomputer 11.

Subsequently at step #31, a charging operation of the built-in flash device is stopped. Although charging control of the built-in flash device must naturally have been stopped at step #12, if the external flash device 10 is in an automatic light emission mode and is already in a fully charged condition, then since the sequence advances from step #12 to step #13 even if the built-in flash device is not yet in a fully charged condition, the loop from the step #4 to the step #28 may be executed while continuing charging of the built-in flash device. Therefore, the sequence advances to the standby routine only after charging of the built-in flash device is stopped at step #31. Such stopping of charging is effected by changing the signal CHGCNT to an "H" level.

In the meantime, if an in-focus condition and an on-state of the switch S2 are determined at steps #14 and #15, respectively, a release operation is performed subsequently. First at step #16, the switches SDRV1 and SDRV2 are checked to judge whether or not a self mode is set. In case a self photographing mode is set, the sequence advances to step #17 at which a self counting time (delay time to exposure control; about ten seconds) is set to a timer in the camera microcomputer 1 and the timer is started. Then at step #18, lens data are read in similarly as at step #6, and then at step #19, flash coverage control is executed similarly as at step #10. Then, a loop from the step #18 to the step #20 is successively executed until the self count time is counted up. Then, if it is detected at step #20 that the timer has counted up the self count time, the sequence advances to step #21. Meanwhile, if it is judged at step #16 that a self photographing mode is not set, the sequence advances directly to step #21. At step #21, a flash coverage changing over operation of the built-in and external flash devices is stopped. While the routine is similar to that at step #30 described hereinabove, here it is executed in order to prevent the flash coverages of the flash devices from being varied during exposure control.

Subsequently at step #22, an exposure controlling operation is executed. The exposure control will be hereinafter described in detail. Then, after completion of the exposure control, a film winding operation is started at step #23. In particular, data are transmitted from the camera microcomputer 1 to the winding controlling section 4, and the winding controlling section 4 automatically drives the winding motor WM in accordance with the data thus received. In this instance, also the mirror, diaphragm and shutter (not shown) are charged simultaneously. Then at step #24, the camera microcomputer 1 waits transition of the switch S3 from an on-state to an off-state, that is, completion of the film winding operation. The signal from the switch S3 is inputted also to the winding driving section 4, and when the winding driving section 4 detects such transition of the switch S3 from an on-state to an off-state, it automatically stops driving of the winding motor WM.

After then, flash coverage control is executed at step #25. While the routine is the same as at step #13, here flash coverage control is started directly after the release operation in order to prepare for a next release operation when the release operation is started before the flash coverage changing over operation is completed.

Then at step #26, the switches SDRV1 and SDRV2 are checked to judge whether or not a successive photographing mode is set. In case a successive photographing mode is set, the sequence returns to the WAKE routine to execute the steps beginning with the step #4 to enable a next release operation. To the contrary, in case it is judged at step #26 that a successive photographing mode is not set, the sequence advances to step #27 at which the switch S2 is checked to wait until the switch S2 is turned off. Consequently, inadvertent successive photographing is prevented. Then, if the switch S2 is turned off, then the sequence advances from step #27 to step #28. Then, if the switch S1 is turned off at step #28, then the sequence advances to the standby routine by way of the steps #29 to #31 as described above, but on the contrary if the switch S1 remains in an on-state, then the sequence returns to the WAKE routine to successively execute the operations described above.

Figure 2A:
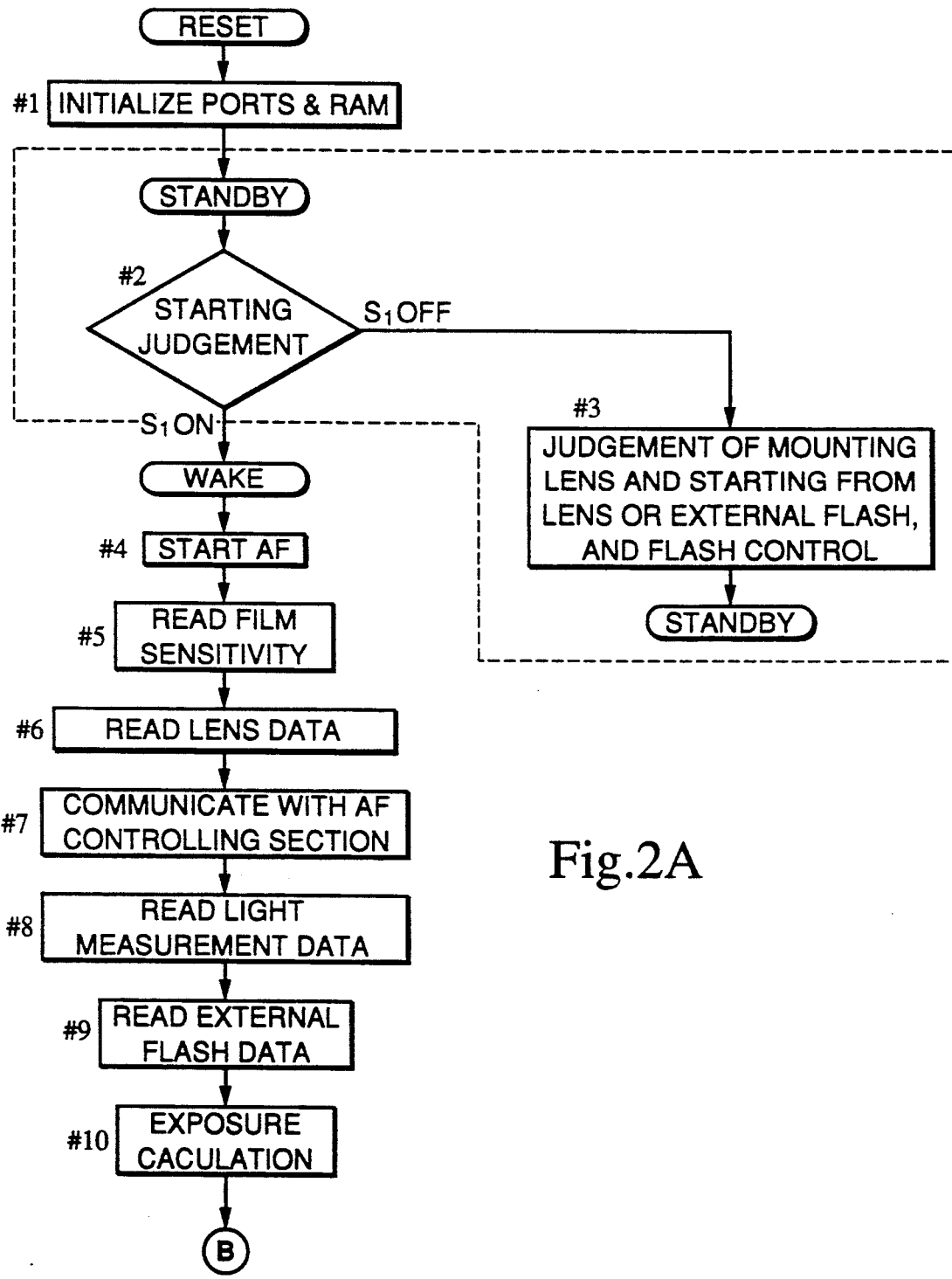
FIGS. 2A and 2B illustrate is a flow chart illustrating operation of a camera body of the camera system of FIGS. 1A and 1B.
Figure 3:
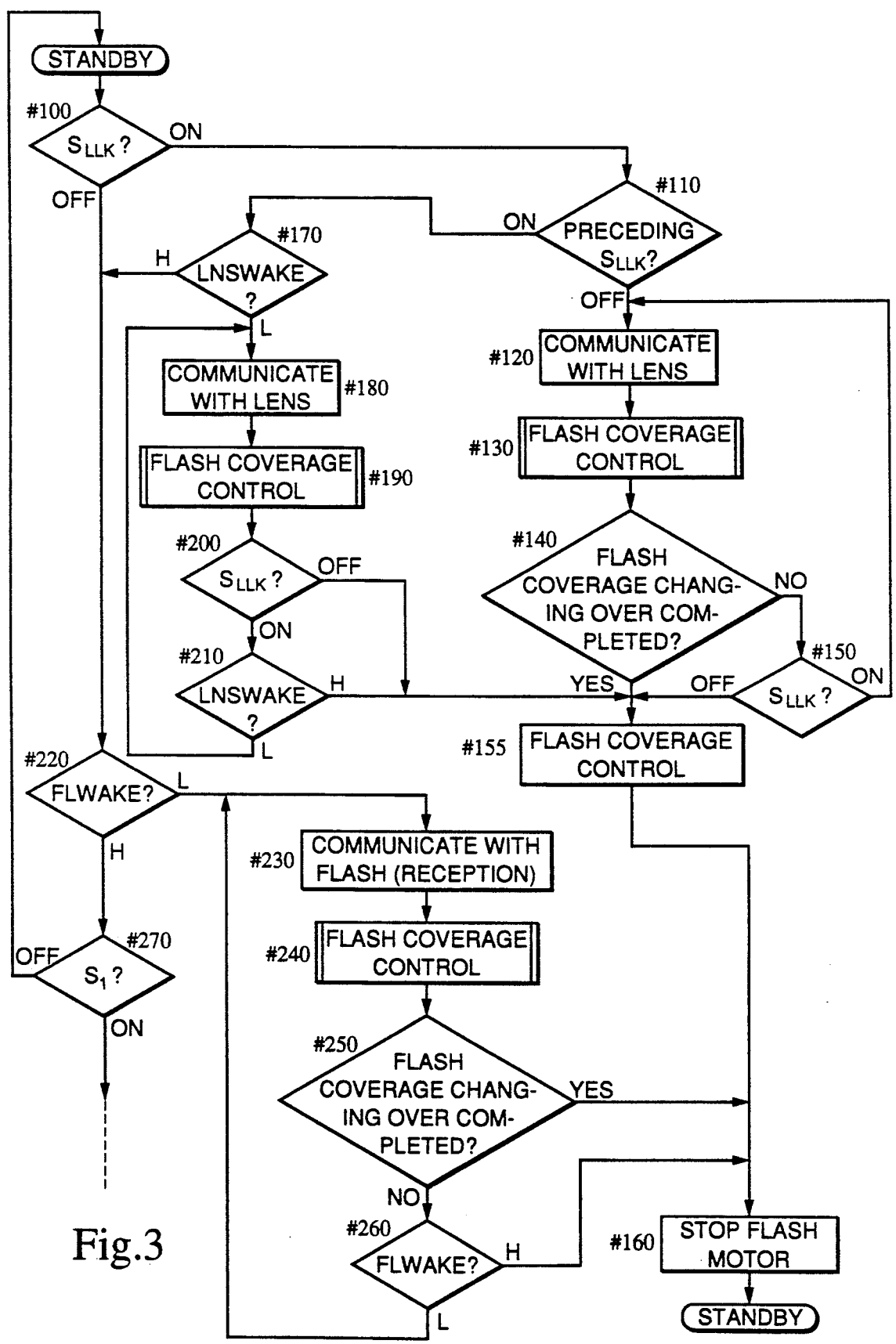

Referring now to FIG. 3, there is shown a detailed flow of operation of the starting judging and processing routine at step #3 of FIG. 2A described hereinabove. The lens detecting switch SLLK is first checked at step #100, and if a lens is mounted, that is, if the switch SLLK is in an on-state, then the sequence advances to step #110 at which a flag (preceding SLLK) representative of whether or not the switch SLLK was in an on-state upon preceding checking of the switch SLLK is checked. If the switch SLLK was precedently in an off-state, then it is considered that a lens has been mounted after then, and in this instance, the sequence advances to step #120 in order to adjust the flash coverage of the built-in flash device in accordance with a focal length of the lens thus mounted. At step #120. in order to find out a focal length of the lens, the camera microcomputer 1 communicates with the lens microcomputer 16 or lens ROM 20 to receive lens data. Then at step #130, a flash coverage controlling subroutine which will be hereinafter described is called to execute a flash coverage changing over operation of the built-in flash device. Also flash coverage changing over of the external flash device is enabled. Subsequently, it is checked at step #140 whether or not the flash coverage changing over operation has been completed, and if the operation has not yet been completed, then the switch SLLK is checked at step #150. This is because, if the lens is removed again before the flash coverage changing over operation is completed after the lens has been mounted, focal length information cannot to obtained, and accordingly, the flash coverage changing over operation must be interrupted. In case the switch SLLK is in an on-state at step #150, the sequence returns to step #120 to repetitively execute the loop of the steps of #120→ #130→#140→#150→#120 until the flash coverage changing over operation is completed. After the flash coverage changing over operation is completed, the sequence advances from step #140 to step #155 at which the flash coverage controlling subroutine is called, and then the sequence advances to step #160 at which the flash motor FM is stopped, whereafter the sequence advances to the standby routine. In case the lens is removed during such flash coverage changing over operation, the sequence advances from step #150 to step #155 so that the flash motor FM may be stopped similarly as after calling of the flash coverage controlling routine, whereafter the sequence returns to the standby routine. Here, the control st step #155 is executed in order to stop the flash coverage changing over operation of the external flash device because the lens has been removed.

On the other hand, in case it is judged at step #110 that the switch SLLK was precedently in an on-state (that is, the lens remains mounted on the camera), the sequence advances to step #170 at which a starting signal LNSWAKE from the lens is checked. If LNSWAKE="L" level, then this means that the switch ST or SW in FIG. 1A has been turned on and the lens is in a power zooming operation. Accordingly, in order to adjust the flash coverage of the built-in flash device in accordance with a variation of the focal length of the lens by such power zooming, the camera computer 1 communicates with the lens to obtain focal length data at step #180, and then at step #190, the flash coverage controlling subroutine is called to start a flash coverage changing over operation. While the switch SLLK remains in an on-state and the starting signal LNSWAKE remains in an "L" state, the flash coverage changing over operation is continued in a loop of the steps of #180→#190→#200→#210→#180. In case the lens is removed so that the switch SLLK is turned off or both of the switches ST and SW are switched into an off-state so that the starting signal LNSWAKE is changed to an "H" level during such continuous flash coverage changing over operation, the sequence advances from step #200 or #210 to step #155 at which the flash coverage changing over operation of the external flash device is stopped, whereafter the flash motor FM is stopped at step #160 and then the sequence advances to the standby routine.

In case the starting signal LNSWAKE is in an "H" state at step #170 or the switch SLLK is in an off-state (this means that on lens is mounted) at step #100. The sequence advances to step #220 at which the starting signal FLWAKE from the external flash device 10 is checked. If a manual operation for the flash device 10, then the external flash device 10 performs a flash coverage changing over operation of itself and changes its signal FLWAKE to an "L" level to cause starting of the camera body. If this is detected at step #220, then the camera microcomputer 1 advances the sequence to step #230 at which it communicates with the external flash device 10 to obtain information of the flash coverage position manually set on the external flash device 10. Then at step #240, the flash coverage controlling routine is called. In the flash coverage controlling routine, the flash coverage position set in the external flash device and the flash coverage position of the built-in flash device are compared with each other, and if they are different from each other, then a flash coverage changing over operation of the built-in flash device is started. Subsequently at step #250, it is checked whether or not the flash coverage changing over operation has been completed, and if the operation has not yet been completed, the sequence advances to step #260 at which the signal FLWAKE is checked. Then, if the signal FLWAKE is at an "L" level, then the sequence returns to step #230. Thus, while the signal FLWAKE remains at an "L" level, the loop of the steps #230→#240→#250→#260→#230 is successively executed to drive the flash coverage controlling section 9 of the built-in flash device until the flash coverage position of the built-in flash device coincide with the flash coverage position manually set on the external flash device. At a point of time when they come into coincidence with each other, the camera microcomputer 1 transmits it to the external flash device 10 in the flash coverage controlling subroutine that the built-in flash device has completed its flash coverage changing over operation (step #780 in FIG. 5B). When the signal is received, the external flash device 10 changes the signal FLWAKE to an "H" level. The camera microcomputer 1 receives the signal FLWAKE and advances the sequence from the step #260 to step #160 at which the flash motor FM is stopped (in this instance, the flash motor FM has been stopped already in the flash coverage controlling subroutine), whereafter the sequence returns to the standby routine.

Figure 2B:
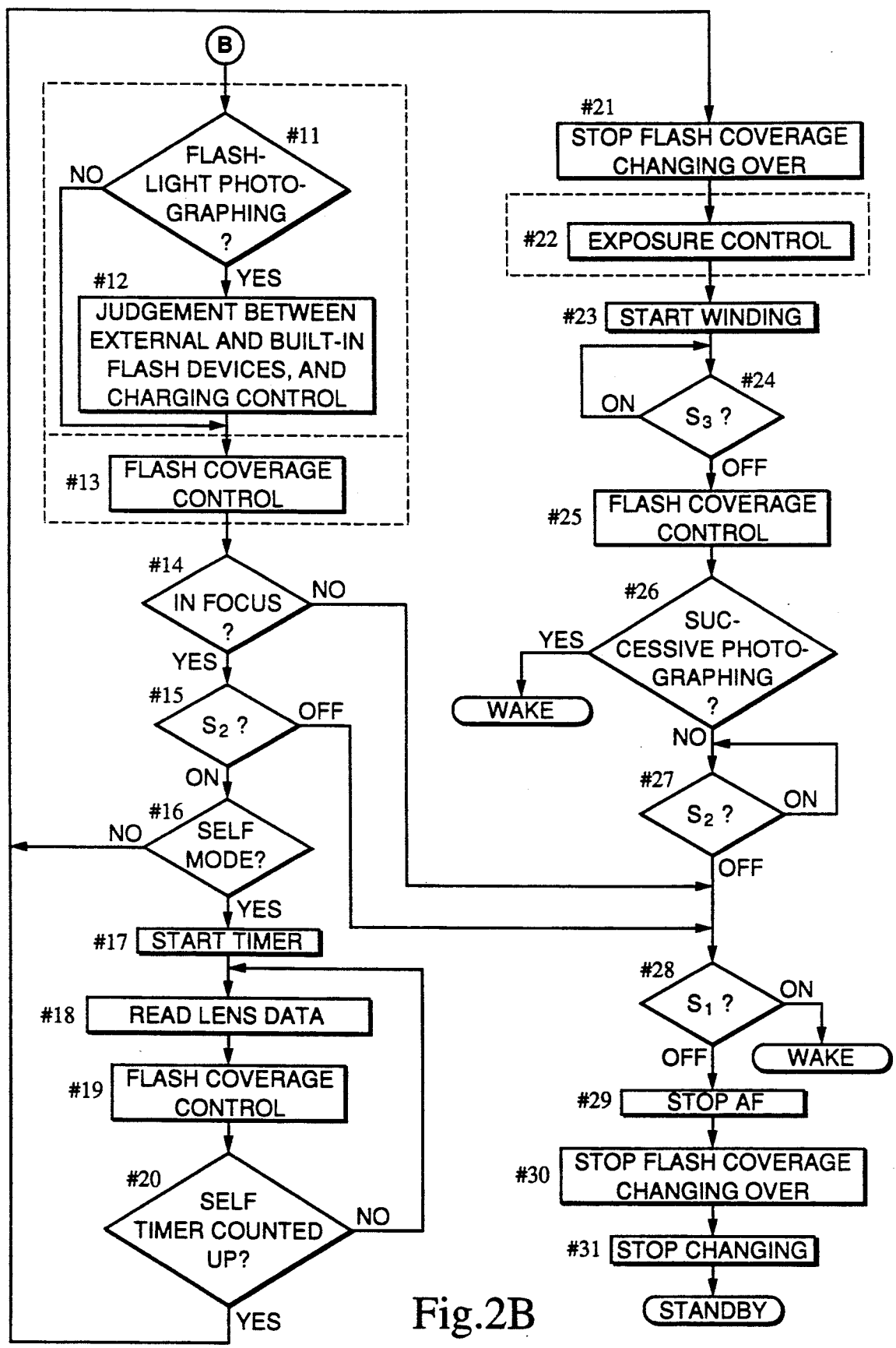

Normally, when the signals FLWAKE and LNSWAKE are both in an "H" state, if the switch SLLK is in an on-state, then the sequence advances to step #270 by way of a route of the steps #100→#110→#170→#220→#270, but on the contrary if the switch SLLK is in an off-state, then the sequence advances to step #270 by way of another route of the steps #100→#220→#270 At step #270, the light measuring switch S1 is checked, and if the switch S1 is in an on-state, then the sequence advances to the WAKE routine shown in FIGS. 2A and 2B. But on the contrary if the switch S1 is in an off-state, then the sequence advances to the standby routine.

FIG. 4 shows a detailed flow of operations of the built-in flash device charging controlling routine at steps #11 and #12 of FIG. 2B. Referring to FIG. 4, it is first checked at step #300 whether or not an exposure mode obtained as a result of an exposure calculation at step #10 of FIG. 2A is flash control (a flashlight photographing mode), and if the exposure mode is flash control (that is, if at least one of the built-in flash device and the external flash device is in an automatic light emission modes), then the sequence advances to step #310 at which the switch SFL is checked. If the switch SFL is in an on-state, that is, if the built-in flash device is in an automatic light emission mode, then the sequence advances to step #320 at which it is judged whether or not the built-in flash device is in a fully charged condition. Then, if the built-in flash device is not yet in a fully charged condition, then the signal CHGCNT is changed to an "H" level at step #330 to start charging of the built-in flash device. On the other hand, if the switch SFL is in an off-state at step #310, that is, if the built-in flash device is in a light emission inhibition mode, then the sequence advances to step #340. At step #340, it is judged whether or not the external flash device 10 is in a fully charged condition, and if the external flash device 10 is not in a fully charged ocndition, then the sequence advances to step #350 at which the flash motor FM is stopped. Then at step #360, flash coverage changing over inhibiting data to the external flash device 10 are set, and then in communication at step #370, the data are transmitted to the external flash device 10, whereafter the sequence returns to step #300. It is to be noted that, in case the external flash device 10 is set in a light emission inhibiting mode by way of the switch FSM, even if it is in a fully charged condition, full charge data are not transmitted to the camera. In this manner, in case neither of the built-in and external flash devices is in a fully condition while the exposure mode is flash control, it is waited until either one of the built-in and external flash devices is put into a fully charged condition whil executing the loop of the steps #300→#310→#320→#330→#340→#350→#360→#370→#300. During such control, a release operation is inhibited and a flash coverage changing over operation is also inhibited. Then, if the built-in flash device comes into a fully charged condition, then the sequence advances from step #320 to step #325 at which the signal CHGCNT is reset to stop charging of the built-in flash device, whereafter the sequence advances to step #380. On the other hand, if the external flash device comes into a fully charge condition, then the sequence advances from step #340 to stop #380. At step #380, the flash coverage controlling subroutine is called, whereafter the sequence advances to a next routine. In the meantime, if the exposure mode is not flash control at step #300, the sequence advances to step #325 at which charging of the built-in flash device is stopped, whereafter the sequence advances to step #380.

Figure 5A:
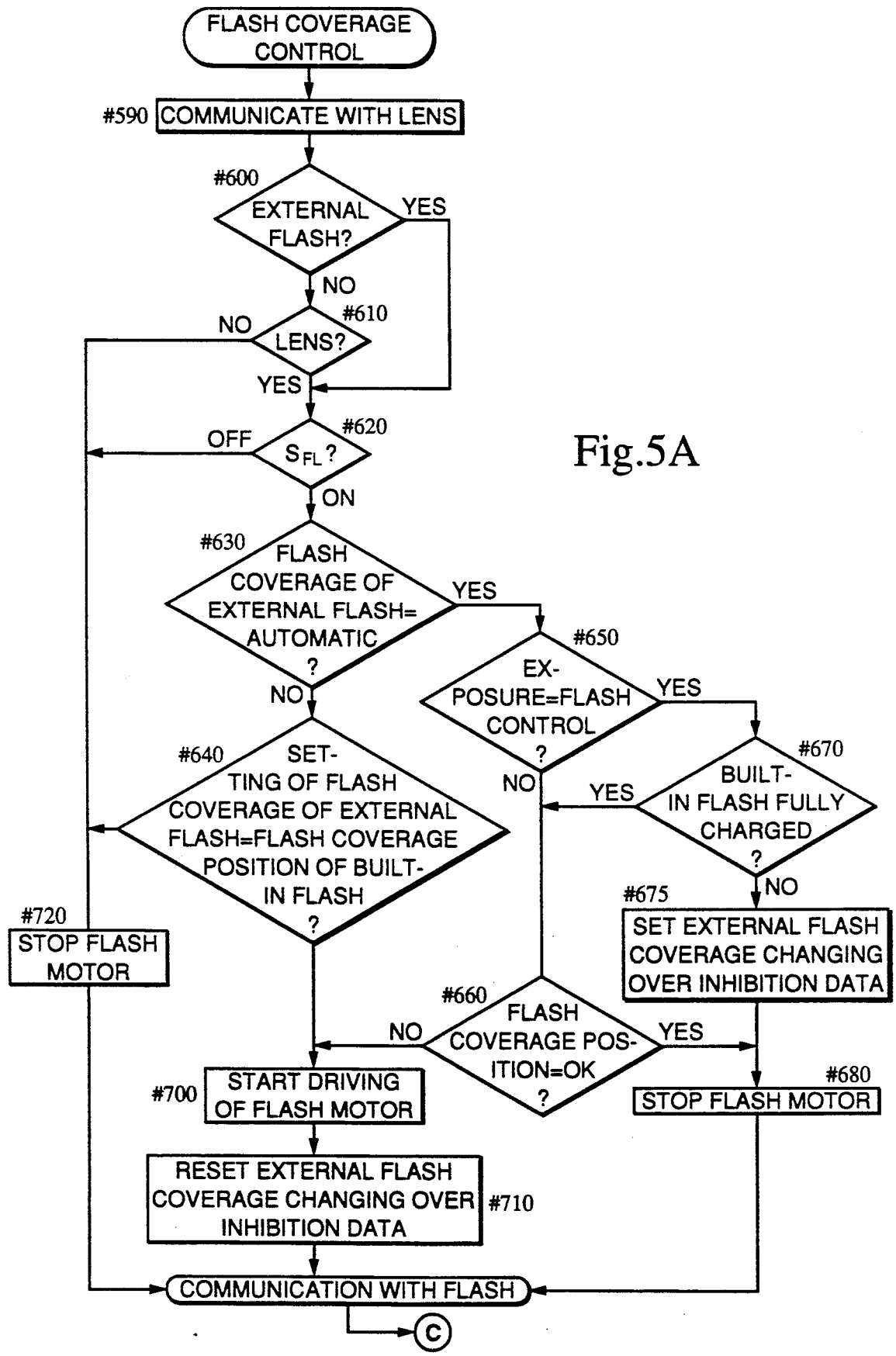
Figure 5B:
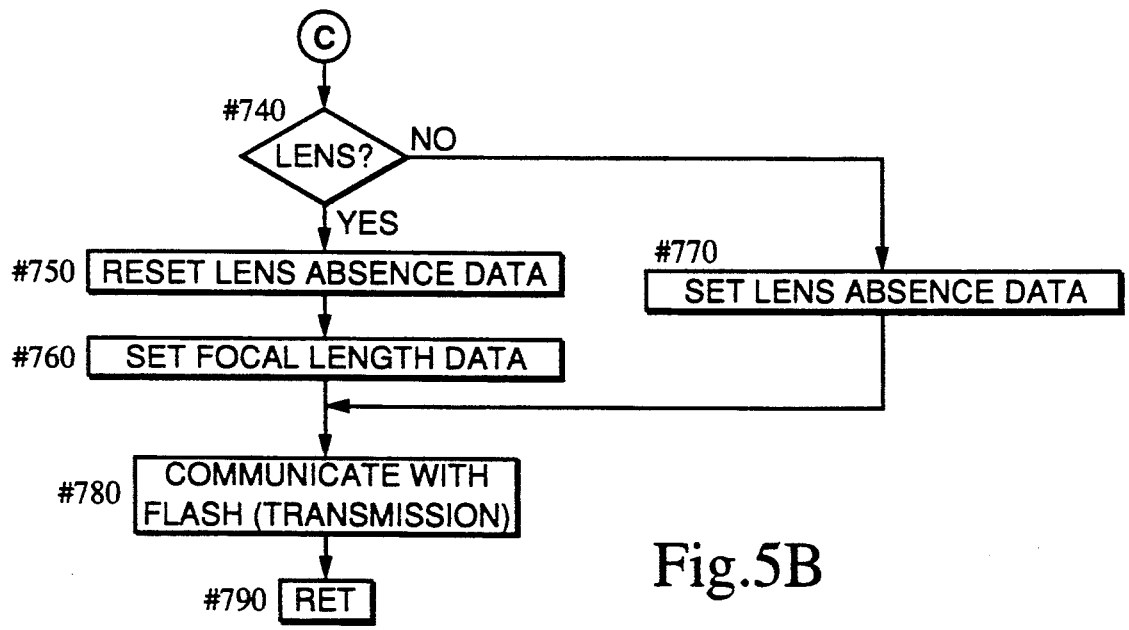

Referring now to FIGS. 5A and 5B the flash coverage controlling subroutine at step #13 of FIG. 2B and so forth is shown. First at step #590, information of a focal length of a lens is read in. Then at step #600, a current condition of an external flash device is checked. In case no external flash device is mounted on the camera or an external flash device is mounted on the camera and yet it is not set to a manual flash coverage changing over mode, the sequence advances to step #610 at which it is checked whether or not a lens is mounted on the camera. If no lens is mounted, the sequence advances to step #720 at which the flash motor FM is stopped. On the contrary, if an external flash device is mounted on the camera and set in a manual flash coverage changing over mode, the sequence advances directly to step #620 bypassing the step #610. This is intended to cause, when the flash coverage of the external flash device is manually changed over, also the built-in flash device to perform a flash coverage changing over operation. At step #620, the switch SFL is checked, and if the switch SFL is in an off-state and hence the built-in flash device is inhibited from emission of flashlight, the sequence advances to step #720, and consequently, the built-in flash device does not perform a flash coverage changing over operation.

On the contrary if the switch SFL is in an on-state at step #620, then the sequence advances to step #630 at which it is judged whether the flash coverage changing over mode of the external flash device is an automatic flash coverage changing over mode or a manual flash coverage changing over mode, and if it is an automatic flash coverage changing over mode, then the sequence advances to step #650. At step #650, it is judged whether or not the exposure mode is flash control (a flashlight photographing mode), and if the exposure mode is flash control, then the sequence advances to step #670 at which it is judged whether or not the built-in flash device is in a fully charged condition. If the built-in flash device is not yet in a fully charged condition, then the sequence advances to step #675 at which flash coverage changing over inhibition data to the external flash device are set, whereafter the sequence advances to step #680 at which the flash motor FM is stopped. Accordingly, in case the external flash device is in a fully charged condition but the built-in flash device is not yet in a fully charged condition, the internal flash device performs a charging operation prior to a flash coverage changing over operation. In case the exposure mode is not flash control at step #650, the sequence advances to step #660 at which it is judged whether or not the flash coverage position corresponds to the focal length of the lens.

If they correspond to each other, then the sequence advances to step #680 at which the flash motor FM is stopped. But on the contrary if they do not correspond to each other, then the sequence advances to step #700 at which driving of the flash motor is started to perform changing over a flash coverage, and then to step #710 at which the flash coverage changing over inhibition data to the external flash device are reset.

In the meantime, in case the flash coverage changing over mode of the external flash device is a manual flash coverage changing over mode at step #630, the sequence advances to step #640 at which it is judged whether or not the flash coverage position manually set on the external flash device and the flash coverage position of the internal flash device coincide with each other, and if they do not coincide with each other, then the sequence advances to step #700 at which a flash coverage changing over operation is started. On the other hand, if such coincidence is judged at step #640, the sequence advances to step #720 at which the flash motor FM is stopped. Also in case absence of a lens is judged at step #610 or the switch SFL is in the off-state at step #620, the sequence advances to step #720 at which the flash coverage changing over operation of the built-in flash device is stopped.

Then at step #740, it is judged whether or not a lens is mounted on the camera. In case no lens is mounted as yet, the sequence advances to step #770 at which lens absence data to be transmitted to the external flash device are set, whereafter the sequence advances to step #780. On the contrary, in case it is judged at step #740 that a lens is mounted on the camera, such lens absence data as mentioned above are reset at step #750, and then focal length data received from the lens mounted on the camera are set at step #760 in order to transmit them to the external flash device. After then, the sequence advances to step #780 at which various data are transmitted to the external flash device including data of presence or absence of a lens mounted on the camera, focal length data of the lens, data of permission or inhibition of a flash coverage changing over operation of the external flash device and data of whether the built-in flash device is performing a flash coverage changing over operation. If the external flash device identifies that a lens is not yet mounted on the camera, the external flash device inhibits a flash coverage changing over operation thereof except when the flash coverage is manually changed over. Subsequently, the sequence advances to step #790 at which the subroutine is completed and the sequence returns to the main routine.

A detailed flow of operations of the exposure controlling routine at step #10 in FIG. 2A is shown in FIG. 6. In the exposure controlling routine, operation proceeds from starting of an exposure operation for a film to completion of the exposure operation for the film.

Referring to FIG. 6, film sensitivity data read in at step #5 in FIG. 2A are transmitted to the light measuring section 6 first at step #400. In accordance with the data thus received, the light measuring section 6 automatically sets an integration level for the adjustment of flashlight. Then at step #410, the flash coverage changing over motor FM of the built-in flash device is stopped. At setp #420, flash coverage changing over inhibition data for stopping a flash coverage changing over operation of the external flash device are set, and the data are transmitted to the external flash device at step #430. This is intended to prevent a flash coverage of flashlight from being varied during an exposure operation. Then at step #440, the mirror is moved up. When the mirror reaches a fully moved up position, the switch S3 is turned on. In response to such turning on of the switch S3, the signal INTST is changed to an "L" level to cause the light measuring section 6 to start its integrating operation. Subsequently, the sequence advances to step #450 at which the trailing shutter blind (not shown) of the shutter is started and then to step #460 at which the shutter speed timer is started, whereafter the sequence advances to step #470. At step #470, it is judged whether or not the exposure mode obtained by the exposure calculation at step #10 in FIG. 2A is flash control, and then if the exposure mode is flash control, then the sequence advances to step #480 at which it is judged whether or not the information of the focal length of the lens obtained at step #120 or #180 in FIG. 3 exceeds a limit of a range of the focal length in which the built-in flash device can distribute flashlight. If the information exceeds the limit, a current condition of the external flash device is checked at step #490. If the external flash device is not yet in a fully charged condition, then the sequence advances to step #500, but on the contrary if the external flash device is already in a fully charged condition, then the sequence advances to step #530. Meanwhile, if the focal length information of the lens does not exceed the limit of the flash coverage range at step #480, then the sequence advances to step #500.

For example, where the focal length of the lens is 28 mm and the changing over range of the flash coverage of the built-in flash device is 35 mm to 70 mm, the flash coverage of the built-in flash device may not cover an entire area of a frame of a film. Thus, making use of the fact that an external flash device normally has a wider flash coverage changing over range than an internal flash device, if the external flash is also in an automatic light emission mode and is in a condition wherein it can emit flashlight, that is, it is in a fully charged condition, then only the external flash device is caused to emit flashlight, thereby preventing irregular exposure by emission of flashlight from the built-in flash device.

At step #500, it is waited until the switch SX is turned on, and after the switch SX is turned on, if the external flash device is also in a light emission mode, then the external flash device starts to emit flashlight precedently. Description of flashlight from the external flash device is omitted here. The built-in flash device waits at step #510 until the external flash device emits flashlight, and then at step #520, the signal TRG is changed to an "L" level to cause the built-in flash device to emit flashlight.

The reason why emission of flashlight from the built-in flash device is delayed with respect to emission of flashlight from the external flash device by the wait control at step #510 in the present embodiment is that the built-in flash device has a drawback that it likely suffers from a red eye phenomenon because it is located nearer to an optical axis of the lens system of the camera. In case the external flash device is caused to emit flashlight precedently and light adjustment is successfully achieved only with flashlight from the external flash device, the built-in flash device need not emit flashlight, and occurrence of a red eye phenomenon can be prevented.

Meanwhile, even if the processing at step #480 or at step #490 in the present embodiment is omitted, if the external flash device is caused to emit flashlight precedently, then the amount of flashlight to be emitted from the built-in flash device can be reduced, and such exposure irregularity as described above can be minimized.

When a predetermined integration level of flashlight is reached as a result of emission of flashlight from the external flash device and the built-in flash device, the light measuring section 6 produces a light emission stopping signal FLSTP to stop the emission of flashlight from the external flash device and the built-in flash device. After then, the sequence advances to step #530. At step #530 to which the sequence also advances from step #470 when the exposure mode is flash control, it is waited that the shutter speed timer completes its counting operation. Then, when the shutter speed timer completes its counting operation, the sequence advances to step #540 at which the second or trailing shutter blind (not shown) of the shutter is caused to move to end the exposure of the film, and then the signal INTST is changed to an "H" level in order to cause the light measuring section 6 to stop its integrating operation.

Referring now to FIG. 7, there is shown a flow of operations of the lens microcomputer 16 of the power zoom lens 15. First, when a battery not shown is mounted in position into the power zoom lens 15, the power zoom lens microcomputer 16 is reset and starts its operation beginning with a reset routine. In the reset routine, a RAM (not shown) of the lens microcomputer 16 is initialized at step 2010, and then setting of ports is executed at step #2011, whereafter the lens microcomputer 16 sends, at step #2012, to the power zoom controlling section 17 a signal for controlling the power zoom motor ZM to be braked. After then, the sequence advances to a next LOOP routine.

In the LOOP routine, a zoom position signal is read in from the zoom position detecting section 18 at step #2020, and then at step #2030, data to be transmitted from the power zoom lens 15 to the camera microcomputer 1 (including focal information data and data representative of lens characteristics at different focal lengths) are set to the RAM from which they are to be read out upon transmission in a transmission routine at step #2032. Then, if a request for transmission is received from the camera microcomputer 1 at step #2031, then the power zoom lens microcomputer 16 executed the transmission routine at step #2032 in which the data set in the transmission data setting routine at step #2030 are transmitted to the camera microcomputer 1 by a known method, and after then, power zoom lens tele end judgment is executed at step #2040. On the contrary, if there is no such request for transmission at step #2031, the sequence directly advances to step #2040 at which such power zoom lens tele end judgment is executed. In the power zoom lens tele end judgment at step #2040, it is judged whether or not the focal length read in in the zoom position reading processing at step #2020 corresponds to the tele side end of the power zoom lens 15, and then in case the focal length corresponds to the tele side end, the sequence directly advance to step #2043 in order to execute power zoom lens wide end judgment, but on the contrary in case the focal length does not correspond to the tele side end, then the sequence advances to step #2041 in order to execute STON judgment. If the switch ST is in an on-state in the STON judgment at step #2041, then SWON judgment is executed at step #2042. If the swtich SW is in an off-state in the SWON judgment at step #2042, a zoom driving operation to the tele side is executed at step #2052, but on the contrary if the switch SW is in an on-state, then a zoom braking operation is executed at step #2051. If the switch ST is in an off-state in the STON judgment at step #2041, the power zoom lens wide end judgment is executed at step #2043 similarly as in the case when the focal length coincides with the tele side end in the power zoom lens tele end judgment at step #2040. Then, if the focal length coincides with the wide side end of the power zoom lens 15, a zoom braking operation is executed at step #2051. On the contrary if the focal length does not coincide with the wide side end, SWON judgement is executed subsequently at step #2044, and if the switch SW is in an on-state, then STON judgment is executed at step #2045. Then, if the switch ST is in an off-state at step #2045, then a zoom driving operation to the wide side is executed at step #2050. When the switch SW is in an off-state in the SWON judgment at step #2044 or when the switch ST is in an on-state in the STON judgment at step #2045, a zoom braking operation is executed at step #2051.

In the zoom driving operation to the wide side at step #2050, the zoom braking operation at step #2051 and the zoom driving operation to the tele side at step #2052, the lens microcomputer 16 transmits to the power zoom controlling section 17 a signal to rotate the power zoom motor ZM toward the wide side, a signal to brake the power zoom motor ZM and a signal to rotate the power zoom motor ZM toward the tele side, respectively. After the zoom driving operation to the wide side, the zoom braking operation or the zoom driving operation to the tele side is executed at step #2050, #2051 or #2052, the sequence returns to the LOOP routine in order to thereafter repeat a similar sequence of operations.

Figure 8A:
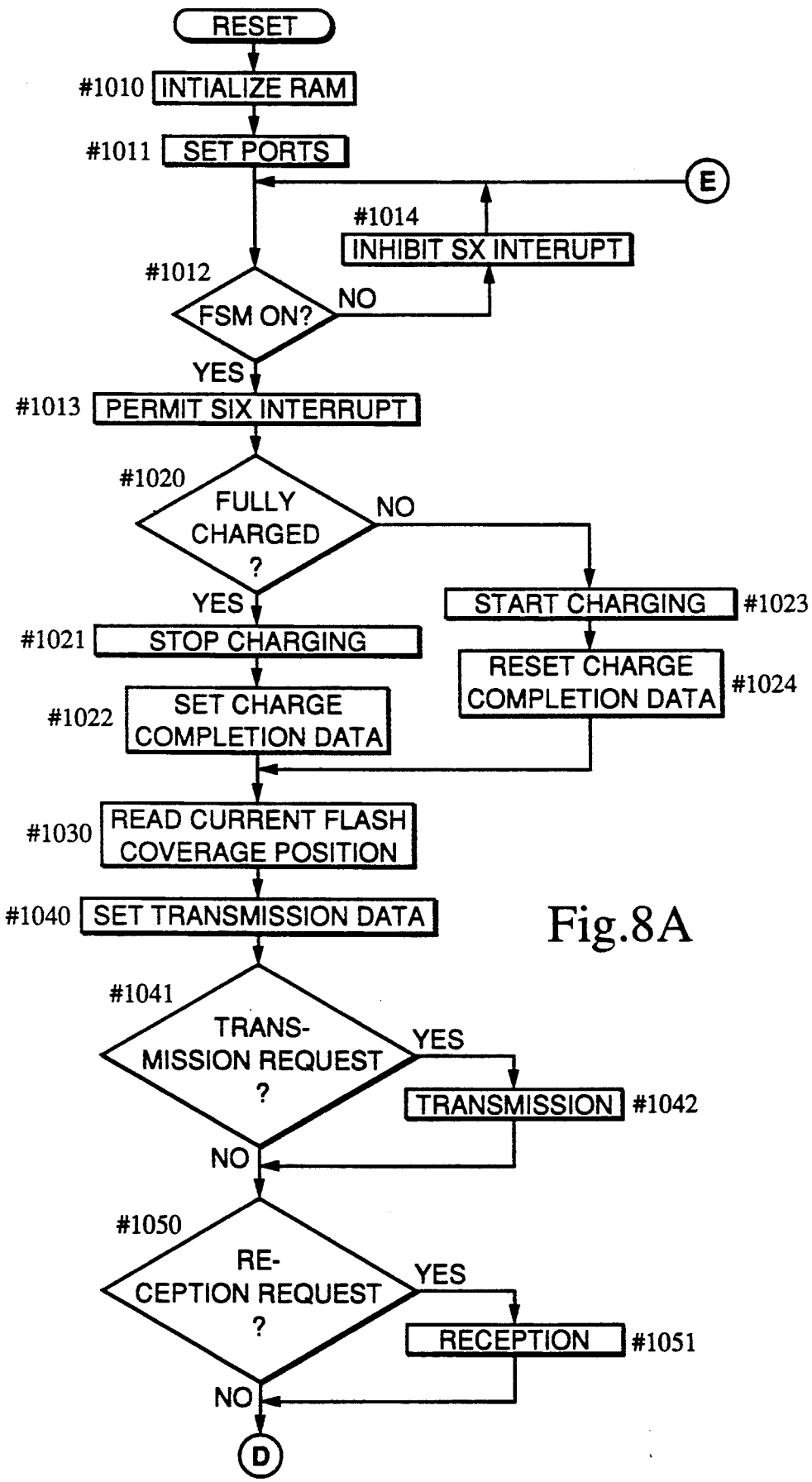
Figure 8B:
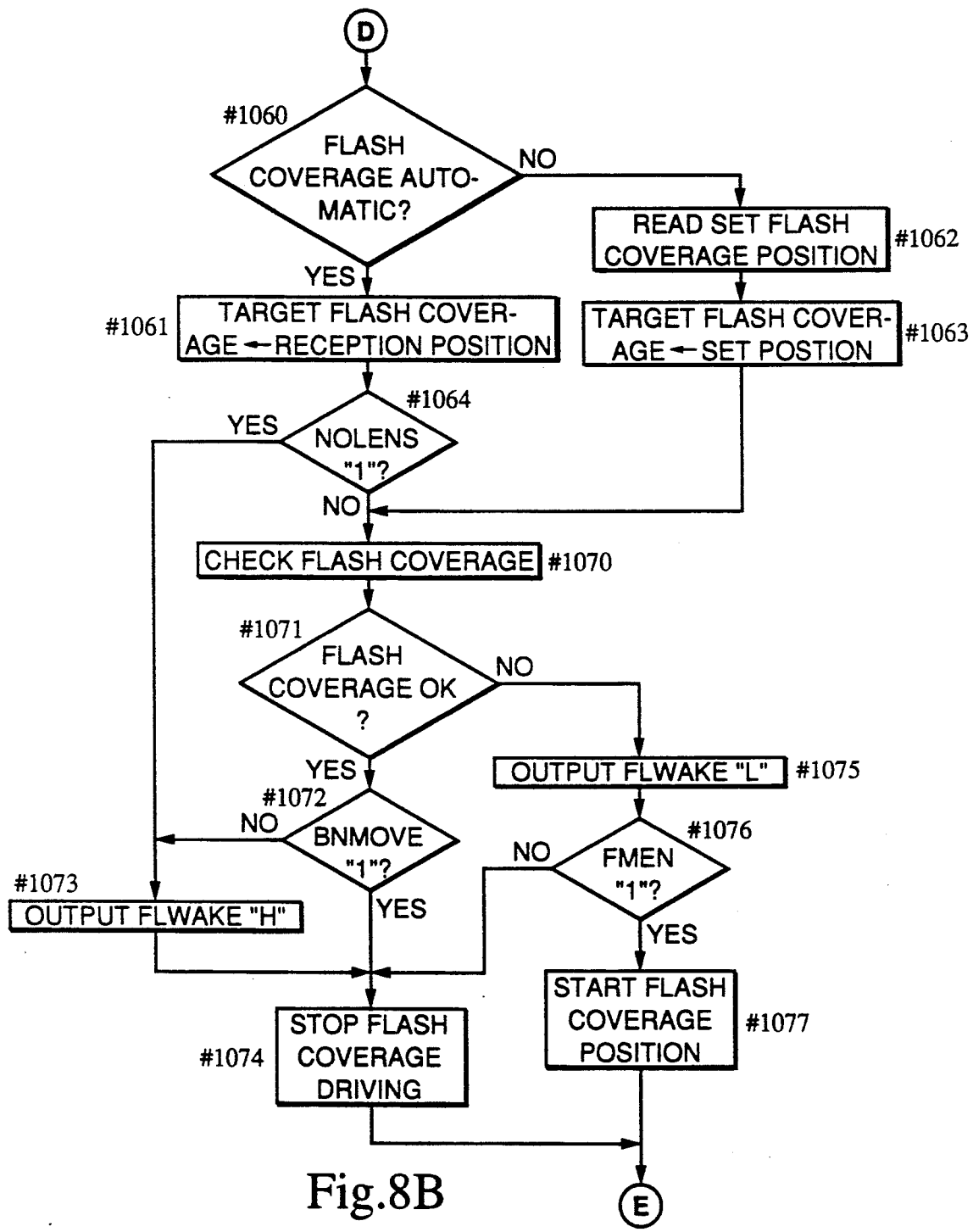
Figure 8C:
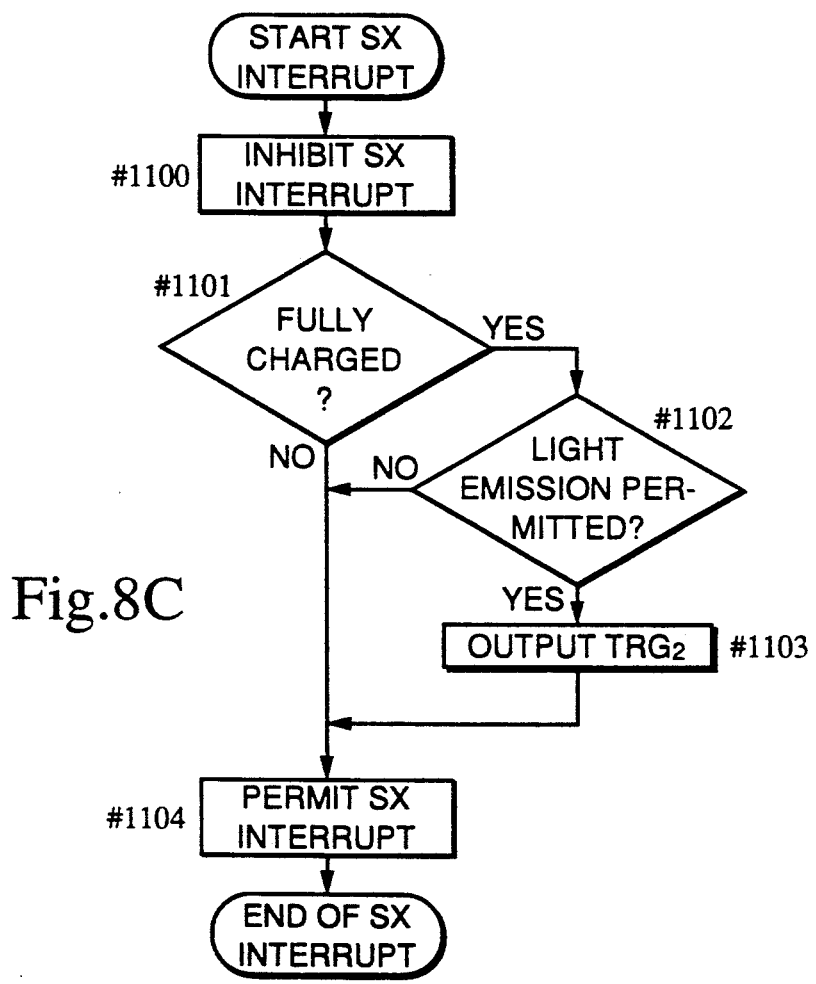

Referring now to FIGS. 8A-8C there is shown a flow of operations of the flash microcomputer 11 of the external flash device 10. In response to loading of a battery (not shown) in position into the external flash device 10, the external flash microcomputer 11 is reset and starts its operation beginning with a reset routine.

A RAM (not shown) of the flash microcomputer 11 is initialized first at step #1010 to reset charge completion data FLOK and manual flash coverage execution data FSAMON. Subsequently at step #1011, initialization of ports is executed, and then at step #1012, FSMON judgment is executed. If the switch FSM connected to an input port FIP0 of the flash microcomputer 11 is in an off-state in the FSMON judgment at step #1012, then the control sequence returns by way of step #1014 to the FSMON judgment at step #1012 so that the flash microcomputer 11 waits until the switch FSM is turned on. In case the switch FSM is in an on-state in the FSMON judgment at step #1012, the sequence advances to step #1013 at which SXINT permission is executed. Here, interrupt control to an SXINT routine which will be hereinafter described is permitted to make it possible to meet a request of the camera for the emission of flashlight. Subsequently, a signal MON2 connected to an input port FIP5 is checked at step #1020 to judge whether or not the flash circuit section 12 is in a fully charged condition. In particular, if the MON2 signal is in an "H" level, then this means that the flash circuit section 12 is not yet in a fully charged condition, and the external flash microcomputer 11 outputs, at step #1023, an "L" level at an output port FOP0 thereof to change the signal CHGCNT2 to an "L" level to cause the flash circuit section 12 to start a charging operation. After then, at step #1024, the charge completion data FLOK are reset and it is stored into the RAM that the external flash device 10 is not yet in a fully charged condition. On the contrary, if it is judged in the charge completion judgment at step #1020 that the signal MON2 is in an "L" level and the flash circuit section 12 is in a fully charged condition, then the signal CHGCNT2 signal is changed to an "H" level to cause the flash circuit section 12 to stop its charging operation at step #1021, and then at step #1022, the charge completion signal FLOK are set and it is stored into the RAM that the external flash device 10 is in a fully charged condition.

After setting or resetting of the charge completion signal FLOK at step #1023 or #1024, a current flash coverage position is read in from the flash coverage position detecting section 13 and such current flash coverage position FZNOW is stored into the RAM at step #1030. Then, setting of transmission data is executed at step #1040. Here, data of completion or incompletion of charging derived from the charge completion signal FLOK, data of automatic or manual flashflash coverage derived from the manual flash coverage data FSAMON and manually designated flash coverage position (FZMANU) data which will be hereinafter described are set to the RAM from which the data will be read out in a transmission routine at step #1042 which will be hereinafter described. After then, a data transmission request from the camera microcomputer 1 is checked at step #1041, and in case there is a data transmission request, data transmission is executed at step #1042 in a known method to transmit to the camera microcomputer 1 the data set in the transmission data setting routine at step #1040.

Subsequently, a reception request from the camera microcomputer 1 is checked at step #1050, and if there is a reception request, data reception is executed at step #1051 in a known method to receive lens focal length data ZFZ, external flash flash coverage changing over permission data FMEN, external flash light emission permission data FFEN, built-in flash flash coverage execution data BNMOVE and lens absence data NOLENS. In case there is no reception request in the reception request judgment at step #1050, the sequence advances directly to step #1060, but on the contrary in case there is a reception request at step #1050, the sequence advances to step #1060 after reception of data is executed at step #1051. At step #1060, automatic flash coverage judgment whether or not the switch FSAM is in an off-state is executed in accordance with a condition of an input port FIP4 of the flash microcomputer 11. In case the switch FSAM is in an off-state, that is, when the flash coverage mode is set to an automatic flash coverage mode, the manual flash coverage execution data FSAMON are reset and it is stored into the RAM that the flash coverage mode is an automatic flash coverage mode at step #1061. Further, an automatic flash coverage position FZAUTO which covers the lens focal length data ZFZ is set as a target flash coverage position FZNEW at step #1061. After then, it is judged at step #1064 whether or not the lens absence data NOLENS are in a set state representing that no lens (neither power zoom lens 15 nor normal lens 19) is mounted on the camera, and if the lens absence data NOLENS are in a set state, then the sequence advances to step #1073 in order to output an "H" level as the starting signal FLWAKE which will be hereinafter described.

In the meantime, in case the switch FSAM is in an on-state in the automatic flash coverage judgment at step #1060, that is, in case the flash coverage mode is set to a manually set flash coverage mode, a manually designated flash coverage position FZMANU is read in at step #1062 by way of input ports FIP1, FIP2 and FIP3 indicating conditions of the slide switches FS1, FS2 and FS3, respectively. Then at step #1063, the manual light emission execution data FSAMON are set and it is stored into the RAM that the flash coverage mode is a manual flash coverage mode, and the manually designated flash coverage position FZMANU are set as a target flash coverage position FZNEW. Thus, after an automatic flash coverage position FZAVTO is set to the target flash coverage position FZNEW at step #1061 or after the manually designated flash coverage position FZMANU is set at step #1063, it is judged at step #1071 whether or not the target flash coverage position FZNEW and the current flash coverage position FZNOW coincide with each other.

In case the two positions FZNEW and FZNOW coincide with each other at step #1071, it is judged subsequently at step #1072 whether or not built-in flash flash coverage execution data BNMOVE is in a set state, that is, whether or not the camera microcomputer 1 is in a condition wherein it causes the built-in flash flash coverage controlling section 14 to perform its operation. If the data BNMOVE are in a set state, that is, if the built-in flash device is executing its flash coverage changing over operation, then the flash microcomputer 11 outputs, at step #1074, a braking signal to the external flash light emission changing over motor FM2 to stop the motor FM2, that is, to effect stopping of the flash coverage driving. If the data BNMOVE are in a reset state, that is, if the flash coverage changing over operation of the built-in flash device has been completed, the flash microcomputer 11 outputs an "H" signal at an output port FOP2 thereof to reset the signal FLWAKE for starting the camera microcomputer 1 so as to make the starting request of the camera microcomputer 1 to disappear at step #1073, and then stopping of the flash coverage driving is effected at step #1074 similarly as in the case when the data BNMOVE are in a reset state.

Such processing as described above is executed in order to prevent a flash coverage changing over operation of the built-in flash device from being stopped inadvertently by changing the signal FLWAKE to an "H" level during such flash coverage changing over operation of the built-in flash device.

In the meantime, in case the two positions FZNEW and FZNOW do not coincide with each other other in the judgment at step #1071, the signal FLWAKE is set at step #1075 to request starting of the camera microcomputer 1. Subsequently, it is judged at step #1076 whether or not the external flash flash coverage changing over permission data FMEN are in a set state, and if the data FMEN are in a set state, then at step #1077, the two positions FZNEW and FZNOW are compared with each other, and a signal to rotate the external flash flash coverage changing over motor FM2 in a direction to make the current flash coverage position FZNOW coincide with the target flash coverage position FZNEW is outputted to the flash coverage controlling section 14 to cause the flash coverage controlling section 14 to start a flash coverage changing over operation. On the contrary, if the data FMEN are in a reset state at step #1076, such stopping of flash coverage driving as described above is executed at step #1074. Accordingly, it is possible for the camera microcomputer 1 to permit or inhibit changing over of a flash coverage of the external flash device by setting or resetting the data FMEN, and thus it is possible, for example, to permit or inhibit changing over of a flash coverage during an exposure operation. In this manner, after stopping of flash coverage driving or starting of flash coverage driving is executed at step #1074 or #1077, FSMON judgment is executed again at step #1012, whereafter the loop is repeated.

While the loop is repeated, if the switch SX indicative of completion of movement of the first or leading shutter blind is turned on, then a port FINTO of the flash microcomputer 11 is changed to an "L" level which makes an interruption request to the flash microcomputer 11. If SXINT permission has been executed already at step #1013 when such interruption request is produced, the control sequence advances to SXINT processing. In the SXINT processing, a future interruption request is inhibited and the interruption request accepted already is cleared at step #1100. After then, it is judged at step #1101 whether or not the charge completion signal FLOK is in a set state, and if the signal FLOK is in a set state, then it is judged at step #1102 whether or not the external flash light emission permission data FMEN are in a set state. Then, if the data FMEN are in a set state, then the flash microcomputer 11 outputs, at step #1103, an "H" level at an output port FOP1 thereof for a fixed period of time to cause the flash circuit 12 to produce a signal TRG2 for starting emission of flashlight. After such signal TRG2 is produced at step #1103, or in case the signal FLOK is in a reset state in the FLOK judgment at step #1101 or in case the data FMEN are in a reset state in the FMEN judgment at step #1102, SXINT permission is executed at step #1104, whereafter the control sequence returns from the interruption processing to normal processing.

While the built-in flash device and the external flash device can be used simultaneously in the present embodiment, the built-in flash device may be inhibited from emitting flashlight if the external flash device is put into an automatic light emission mode (the switch FSM is in an on-state and the external flash device is mounted on the camera) even if the built-in flash device is already in an automatic light emission mode (the switch SFL is in an on-state). In this instance, it should be detected in data reading of the external flash device that the external flash device is in an automatic light emission mode, and it should be considered in SFL judgment in the present embodiment that the switch SFL is in an off-state. In this case, when the external flash device is mounted and the switch FSM is turned on, also changing over of a flash coverage of the built-in flash device is inhibited automatically.

It is to be noted that the expressions "flash coverage" and "flash coverage changing over" in the foregoing description of the present embodiment all signify "irradiation range of flashlight" and "irradiation range changing over of flashlight", respectively.

Having now fully described the invention, it will be apparent to one of ordinary skill in the art that many changes and modifications can be made thereto without departing from the spirit and scope of the invention as set forth herein.

What is claimed is:

1. A flashlight emitting device for a camera, comprising:
   exposure controlling means; judging means for judging presence or absence of an interchangeable lens on said camera;
   flashlight emitting means for emitting flashlight upon exposure of a film;
   driving means for varying the flash coverage of said flashlight emitting means between a tele side and a wide side in response to a variation of the focal length of said interchangeable lens;
   a power source for supplying power to said exposure controlling means, flashlight emitting means and driving means; and
   driving controlling means for controlling operation of said driving means such that, when presence of an interchangeable lens on said camera is judged by said judging means, said driving means is rendered operative, but when absence of an interchangeable lens on said camera is judged by said judging means, said driving means is rendered inoperative.

2. A flashlight emitting device for a camera, comprising:
   flashlight emitting means for emitting flashlight upon exposure of a film;
   flash coverage changing over driving means for changing over the flash coverage of said flashlight emitting means between a tele side and a wide side in response to a variation of the focal length of a lens of said camera;
   first controlling means for controlling operation of said flash coverage changing over driving means;
   automatic focusing means for automatically focusing said lens;
   focusing driving means for operating said automatic focusing means in response to a signal from said controlling means;
   a power source for supplying power to said flashlight emitting means, flash coverage changing over driving means, automatic focusing means and focusing driving means; and
   second controlling means for permitting operation of said focusing driving means even during operation of said flash coverage changing over driving means so that said flash coverage changing over driving means and said focusing driving means may be driven simultaneously.

3. A camera capable of receiving thereon an interchangeable lens which includes electromagnetic means serving as a driving source for the variation of the focal length of said interchangeable lens, a manually operable member for activating said electromagnetic means, and means for delivering a starting signal to said camera in response to an operation of said manually operable member, comprising:
   release signal producing means for producing a release signal for starting operation of said camera;
   means for receiving a starting signal from an interchangeable lens mounted on said camera;
   reading means for reading data regarding a focal length of an interchangeable lens mounted on said camera;
   determining means for determining a flash coverage of a flash device built in or mounted on said camera in response to data read by said reading means;
   driving signal producing means for producing a signal for electrically driving a flashlight emitting element of said flash device built in or mounted on said camera so that said flash device may have a flash coverage determined by said determining means; and controlling means for starting, when an interchangeable lens of a type operable by the release signal or the starting signal is mounted on said camera, operation of said reading means, determining means and driving signal producing means in response to the starting signal.

4. A camera as claimed in claim 3 further comprising second electromagnetic means for driving said light emitting element of said flash device, and a power source for supplying power to said first-mentioned electromagnetic means and said second electromagnetic means.

5. A camera having built-in flashlight emitting means, comprising:

mode changing over means for selecting one of a normal photographing mode and a self photographing mode;

a timer operable in the self photographing mode for permitting a shutter release operation after lapse of a predetermined period of time;

exposure controlling means for controlling an exposure operation of said camera in response to a shutter release operation;

driving means for varying the flash coverage of said flashlight emitting means in response to a variation of the focal length of a photographing lens of said camera;

a power source for supplying power to said flashlight emitting means, exposure controlling means and driving means; and controlling means for permitting operation of said driving means, even during a counting operation of said timer for the predetermined period of time, until said exposure controlling means starts its exposure controlling operation whichever mode is selected by said mode changing over means.

6. A flashlight emitting device, comprising:

first flashlight emitting means adapted to be selectively mounted on a camera, said first flashlight emitting means including a manually operable member, determining means for determining a flash coverage of said first flashlight emitting means in response to a manual operation of said manually operable member, first driving means for varying the flash coverage of said first flashlight emitting means so that the flash coverage may coincide with a flash coverage determined by said determining means; and outputting means for outputting flash coverage data determined by said determining means to said camera;

said camera including receiving means for receiving flash coverage data from said outputting means, detecting means for detecting mounting of said first flashlight emitting means onto said camera, data producing means for producing flash coverage data corresponding to a focal length of a photographing lens of said camera, a second flashlight emitting means built in said camera, second driving means for varying the flash coverage of said second flashlight emitting means, and controlling means for driving, when said first flashlight emitting means is mounted on said camera, said second driving means in response to flash coverage data received at said receiving means and for driving, when said first flashlight emitting means is not mounted on said camera, said second driving means in response to flash coverage data produced from said data producing means.

7. A flashlight photographing device, comprising:

data producing means for producing flash coverage data in response to a focal length of a photographing lens;

first flashlight emitting means;

first driving means for varying the flash coverage of said first flashlight emitting means within a range smaller than an upper limit flash coverage in response to flash coverage data produced from said data producing means;

second flashlight emitting means having a flash coverage which is variable to a predetermined flash coverage greater than the upper limit flash coverage of said first flashlight emitting means;

detecting means for detecting whether or not a flash coverage provided by flash coverage data produced from said data producing means is greater than the upper limit flash coverage of said first flashlight emitting means and for outputting a detection signal when the flash coverage provided by the flash coverage data is greater than the upper limit flash coverage; and controlling means for permitting a light emitting operation at least of said first flashlight emitting means when no detection signal is outputted from said detecting means and for inhibiting a light emitting operation of said first flashlight emitting means but permitting a light emitting operation of said second flashlight emitting means when a detection signal is outputted from said detecting means.

8. A flashlight photographing device as claimed in claim 7, wherein said first flashlight emitting means is built in a camera while said second flashlight emitting means is removably mounted on said camera, and said controlling means permits, when no detection signal is outputted from said detecting means, a light emitting operation of said first and second flashlight emitting means but causes said second flashlight emitting means to emit flashlight precedently to said first flashlight emitting means.

9. A flashlight photographing device as claimed in claim 8, wherein said controlling means causes said first flashlight emitting means to emit flashlight after lapse of a predetermined period of time after emission of flashlight from said second flashlight emitting means.

10. A flashlight photographing device, comprising:

first flashlight emitting means built in a camera;

second flashlight emitting means removably mounted on said camera;

detecting means for detecting whether or not said second flashlight emitting means is mounted on said camera;

a synchronization switch; and trigger means for causing said first flashlight emitting means to emit flashlight in response to closing of said synchronization switch when said second flashlight emitting means is not mounted on said camera and for causing, when said second flashlight emitting means is mounted on said camera, said second flashlight emitting means to emit flashlight precedently to said first flashlight emitting means in response to closing of said synchronization switch;

wherein a light emitting element of said second flashlight emitting means is located farther from an optical axis of a photographing lens of said camera than a light emitting element of said first flashlight emitting means.

11. A flashlight photographing device as claimed in claim 10, further comprising light amount controlling means for stopping emission of flashlight from said first flashlight emitting means or said first and second flashlight emitting means when the amount of light reflected from an object upon emission of flashlight from said first flashlight emitting means or said first and second flashlight emitting means reaches a predetermined level.

12. A flashlight photographing device as claimed in claim 10, wherein said trigger means causes said first flashlight emitting means to emit flashlight after lapse of a predetermined period of time after emission of flashlight from said second flashlight emitting means.

13. A camera comprising:
    built-in flashlight emitting means;
    mode designating means for designating one of a first mode in which operation of said flashlight emitting means is prohibited and a second mode in which operation of said flashlight emitting means is permitted in order for said camera to effect flash light photographing;
    exposure controlling means for effecting exposure control in accordance with a mode designated by said mode designating means;
    driving means for varying the flash coverage of said flashlight emitting means between a tele side and a wide side in response to a variation of the focal length of a lens of said camera;
    a power source for supplying electric power to said flashlight emitting means, said exposure controlling means and said driving means; and
    driving controlling means for rendering said driving means inoperative even if said power source is operative when the first mode is designated by said designating means but enabling operation of said driving means when the second mode is designated by said designating means.

14. A camera as claimed in claim 13, further comprising a manually operable member, and said mode designating means designates the mode in response to the manual operation of said manually operable member.

* * * * *

UNITED STATES PATENT AND TRADEMARK OFFICE
CERTIFICATE OF CORRECTION

PATENT NO. : 5,132,718

DATED : July 21, 1992

INVENTOR(S) : Akihiko Fujino, et al.

It is certified that error appears in the above-identified patent and that said Letters Patent is hereby corrected as shown below:

In Col. 1, line 19, change "ot" to --not--.

In Col. 2, line 14, change "oemitted" to --emitted--.

In Col. 4, line 33, after "lens," insert --then the camera is electrically activated in response to--.

In Col. 4, line 61, delete "is".

In Col. 5, line 19, change "IPIO" to --IP10--.

In Col. 5, line 20, change "OPS" to --OP3--.

In Col. 5, line 50, change "a" (second occurrence) to --A--.

In Col. 7, line 45, after "external", insert --flash--.

UNITED STATES PATENT AND TRADEMARK OFFICE
CERTIFICATE OF CORRECTION

PATENT NO. : 5,132,718

DATED : July 21, 1992

INVENTOR(S) : Akihiko Fujino, et al.

It is certified that error appears in the above-identified patent and that said Letters Patent is hereby corrected as shown below:

In Col. 11, line 54, change "to" to --be--.

In Col. 12, line 39, change ".  The" to --, the--.

In Col. 12, line 42, after "flash", insert --coverage changing over is performed on the external flash--.

In Col. 13, line 39, change "modes" to --mode--.

In Col. 14, line 1, change "whil" to --while--.

In Col. 14, line 13, change "stop" to --step--.

In Col. 17, line 47, change "executed" to --executes--.

Signed and Sealed this

Seventh Day of September, 1993

Attest:

BRUCE LEHMAN

Attesting Officer

Commissioner of Patents and Trademarks